United States Patent
Yi et al.

(10) Patent No.: US 10,897,782 B2
(45) Date of Patent: Jan. 19, 2021

(54) METHOD AND DEVICE FOR PERFORMING RANDOM ACCESS PROCEDURE IN WIRELESS COMMUNICATION SYSTEM

(71) Applicant: LG Electronics Inc., Seoul (KR)

(72) Inventors: Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/858,000

(22) Filed: Apr. 24, 2020

(65) Prior Publication Data

US 2020/0252978 A1    Aug. 6, 2020

Related U.S. Application Data

(63) Continuation of application No. PCT/KR2018/012652, filed on Oct. 24, 2018.
(Continued)

(30) Foreign Application Priority Data

May 3, 2018    (KR) .................. 10-2018-0051426
Oct. 24, 2018    (KR) .................. 10-2018-0127496

(51) Int. Cl.
*H04W 74/08*    (2009.01)
*H04W 72/04*    (2009.01)

(52) U.S. Cl.
CPC ... *H04W 74/0833* (2013.01); *H04W 72/0453* (2013.01)

(58) Field of Classification Search
CPC ......... H04W 74/0833; H04W 74/0841; H04W 74/0866; H04W 74/08; H04W 72/0453; H04W 72/0473; H04W 72/06; H04W 72/1205; H04W 72/1263; H04W 72/1284; H04W 72/1289
(Continued)

(56) References Cited

U.S. PATENT DOCUMENTS

2016/0255658 A1* 9/2016 Fujishiro ........... H04W 72/0453
                                                    370/329
2018/0278380 A1* 9/2018 Kim ...................... H04L 5/0064
(Continued)

FOREIGN PATENT DOCUMENTS

WO    WO-2012177054 A2 *  12/2012  ........ H04W 74/0833
WO    WO2017/030412        2/2017

OTHER PUBLICATIONS

Qualcom,"Discussion points on remaining details about RACH procedure", 3GPP TSG RAN WGI, Release 1-1716822, Nagoya, Japan, Sep. 21, 2017 pp. 1-24 (Year: 2017).*
(Continued)

*Primary Examiner* — Afsar M Qureshi
(74) *Attorney, Agent, or Firm* — Fish & Richardson P.C.

(57) ABSTRACT

Provided are a method and device for transmitting MSG3 in a random access procedure in a wireless communication system. A user equipment (UE) determines a frequency resource for transmitting MSG3 in a random access procedure and transmits the MSG3 to a network via the frequency resource. The starting position of the frequency resource is the smallest physical resource block (PRB) of an active uplink (UL) bandwidth part (BWP), and the bandwidth of the frequency resource is the same as the bandwidth of an initial UL BWP.

13 Claims, 16 Drawing Sheets

Related U.S. Application Data

(60) Provisional application No. 62/576,586, filed on Oct. 24, 2017, provisional application No. 62/638,214, filed on Mar. 4, 2018.

(58) Field of Classification Search
USPC .......................................................... 370/329
See application file for complete search history.

(56) References Cited

U.S. PATENT DOCUMENTS

| | | | |
|---|---|---|---|
| 2018/0279229 A1* | 9/2018 | Dinan | H04W 52/146 |
| 2018/0279262 A1* | 9/2018 | Babaei | H04W 72/04 |

OTHER PUBLICATIONS

Huawei et al., "Uplink control channel design for MTC UEs," 3GPP TSG RAN WG1 Meeting #78bis, R1-143718, Ljubljana, Slovenia, Oct. 6-10, 2014, 3 pages.*

Intel Corporation, "Discussion on data and control channel enhancement for eMTC," 3GPP TSG RAN WG1 Meeting #78bis, R1-143771, Ljubljana, Slovenia, Oct. 6-10, 2014, pp. 1-6.*

LG Electronics, "Further remaining details on wider bandwidth operation", R1-1713204, 3GPP TSG RAN WG1 Meeting #90, Prague, Czech Republic Aug. 21-25, 2017, 7 pages.

Huawei, HiSilicon, "Remaining issues in RACH Procedure", R1-1715387, 3GPP TSG RAN WG1 Meeting NR#3, Nagoya, Japan, Sep. 18-21, 2017, 7 pages.

Huawei, HiSilicon, "Coexistence of different UE types on a wideband carrier", R1-1713733, 3GPP TSG RAN WG1 Meeting #90, Prague, Czech Republic, Aug. 21-25, 2017, 6 pages.

Qualcomm, "Discussion Points on remaining details about RACH Procedure", R1-1716822, 3GPP TSG RAN WG1 Meeting #NR-AH3, Nagoya, Japan, Sep. 18-21, 2017, 24 pages.

KR Office Action in Korean Appln. No. 2018-0127496, dated Feb. 18, 2019, 7 pages (with English Translation).

LG Electronics, RMSI delivery and CORESET configuration, R1-1715842, 3GPP TSG RAN WG1 Meeting NR#3, Nagoya, Japan, Sep. 18-21, 2017, 7 pages.

Catt, "Offline summary for AI 7.1.2.2 Remaining details on Remaining Minimum System Information," R1-1719198, Updated from R1-1719145, 3GPP TSG RAN WG1 Meeting 90bis, Prague, CZ, dated Oct. 9-13, 2017, 15 pages.

Extended European Search Report in European Application No. 18870909.1, dated Oct. 8, 2020, 10 pages.

Qualcomm, "Discussion Points on remaining details about RACH Procedure," R1-1716822, 3GPP TSG RAN WG1 Meeting #NR-AH3, Nagoya, Japan, dated Sep. 18-21, 2017, 24 pages.

ZTE, Sanechips, "Summary of PRACH Remaining details on PRACH formats," R1-1719175, 3GPP TSG RAN WG1 Meeting 90bis, Prague, CZ, dated Oct. 9-13, 2017, 29 pages.

* cited by examiner

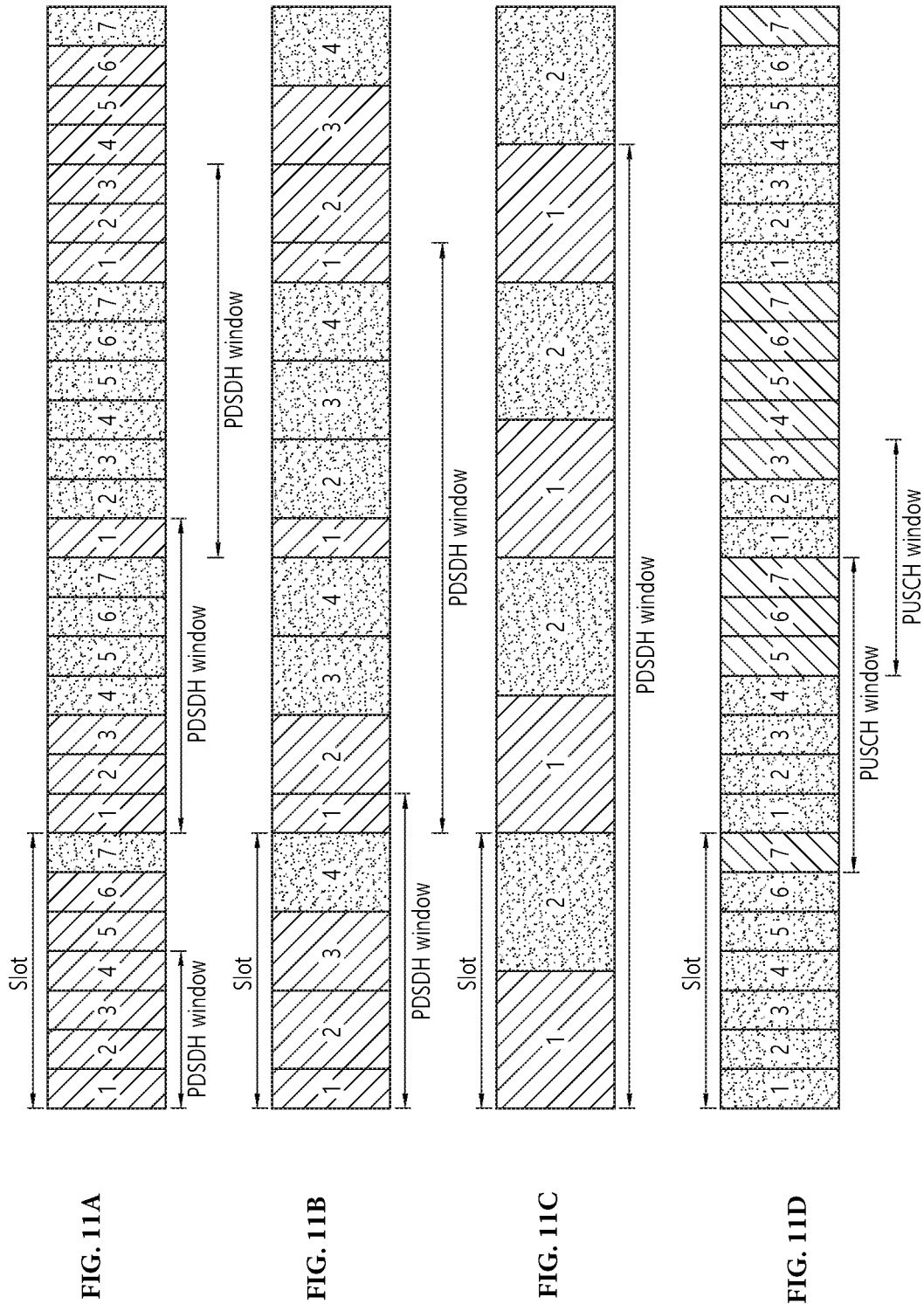

METHOD AND DEVICE FOR PERFORMING RANDOM ACCESS PROCEDURE IN WIRELESS COMMUNICATION SYSTEM

CROSS-REFERENCE TO RELATED APPLICATIONS

Pursuant to 35 U.S.C. § 119(e), this application is a continuation of International Application PCT/KR2018/012652, with an international filing date of Oct. 24, 2018, which claims the benefit of U.S. Provisional Applications No. 62/576,586 filed on Oct. 24, 2017, No. 62/638,214 filed on Mar. 4, 2018, and Korean Patent Applications No. 10-2018-0051426 filed on May 3, 2018, No. 10-2018-0127496 filed on Oct. 24, 2018, the contents of which are all hereby incorporated by reference herein in their entirety.

TECHNICAL FIELD

The present disclosure relates to wireless communication and, more particularly, to a method and an apparatus for performing a random access procedure in a wireless communication system, especially in a new radio access technology (NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

The initial access of the NR is for initial synchronization of downlink and system information acquisition and radio resource control (RRC) connection through a random access procedure, which is basically the same as the purpose of the initial access technology of the 3GPP LTE/LTE-A. In addition, the NR includes various element technologies for supporting multi-beam transmission and wideband from the initial access stage.

SUMMARY

Due to the inherent characteristics of NR, the initial access procedure of NR may be different from the initial access procedure of 3GPP LTE/LTE-A in the related art. The present disclosure discusses a method for allocating frequency resources for transmission of MSG3 in a random access procedure.

In an aspect, a method for transmitting MSG3 in a random access procedure by a user equipment (UE) in a wireless communication system is provided. The method includes determining a frequency resource for transmission of the MSG3 in the random access procedure, and transmitting the MSG3 to a network through the frequency resource. A starting position of the frequency resource is a lowest physical resource block (PRB) of an active uplink (UL) bandwidth part (BWP), and a bandwidth of the frequency resource is identical to a bandwidth of an initial UL BWP.

In another aspect, a user equipment (UE) in a wireless communication system is provided. The UE includes a memory, a transceiver, and a processor connected to the memory and the transceiver. The processor is configured to determine a frequency resource for transmission of MSG3 in a random access procedure, and control the transceiver to transmit the MSG3 to a network through the frequency resource. A starting position of the frequency resource is a lowest physical resource block (PRB) of an active uplink (UL) bandwidth part (BWP), and a bandwidth of the frequency resource is identical to a bandwidth of an initial UL BWP.

In another aspect, a method for receiving MSG3 in a random access procedure by a base station (BS) in a wireless communication system is provided. The method includes receiving a random access preamble from a user equipment (UE), transmitting a random access response to the UE in response to the random access preamble, and receiving the MSG3 from the UE through a frequency resource for transmission of the MSG3. A starting position of the frequency resource is a lowest physical resource block (PRB) of an active uplink (UL) bandwidth part (BWP), and a bandwidth of the frequency resource is identical to a bandwidth of an initial UL BWP.

A frequency resource for transmission of MSG3 in a random access procedure can be allocated efficiently.

BRIEF DESCRIPTION OF THE DRAWINGS

FIGS. 11A to 11D show an example of different virtual resource sets for different mini-slots, etc., according to an embodiment of the present disclosure.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
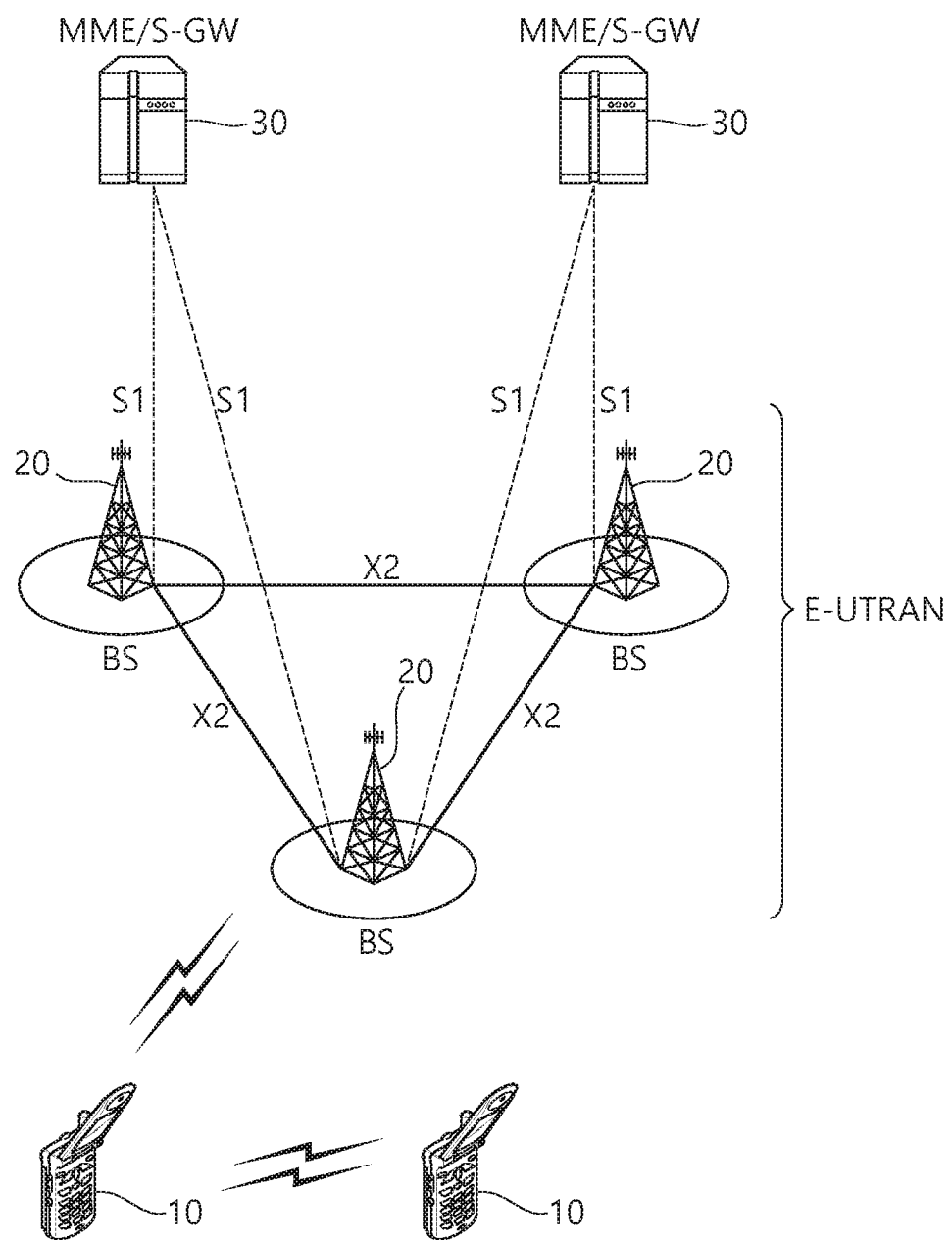
FIG. 1 shows an example of a wireless communication system to which technical features of the present disclosure can be applied.

FIG. 1 shows an example of a wireless communication system to which technical features of the present disclosure can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
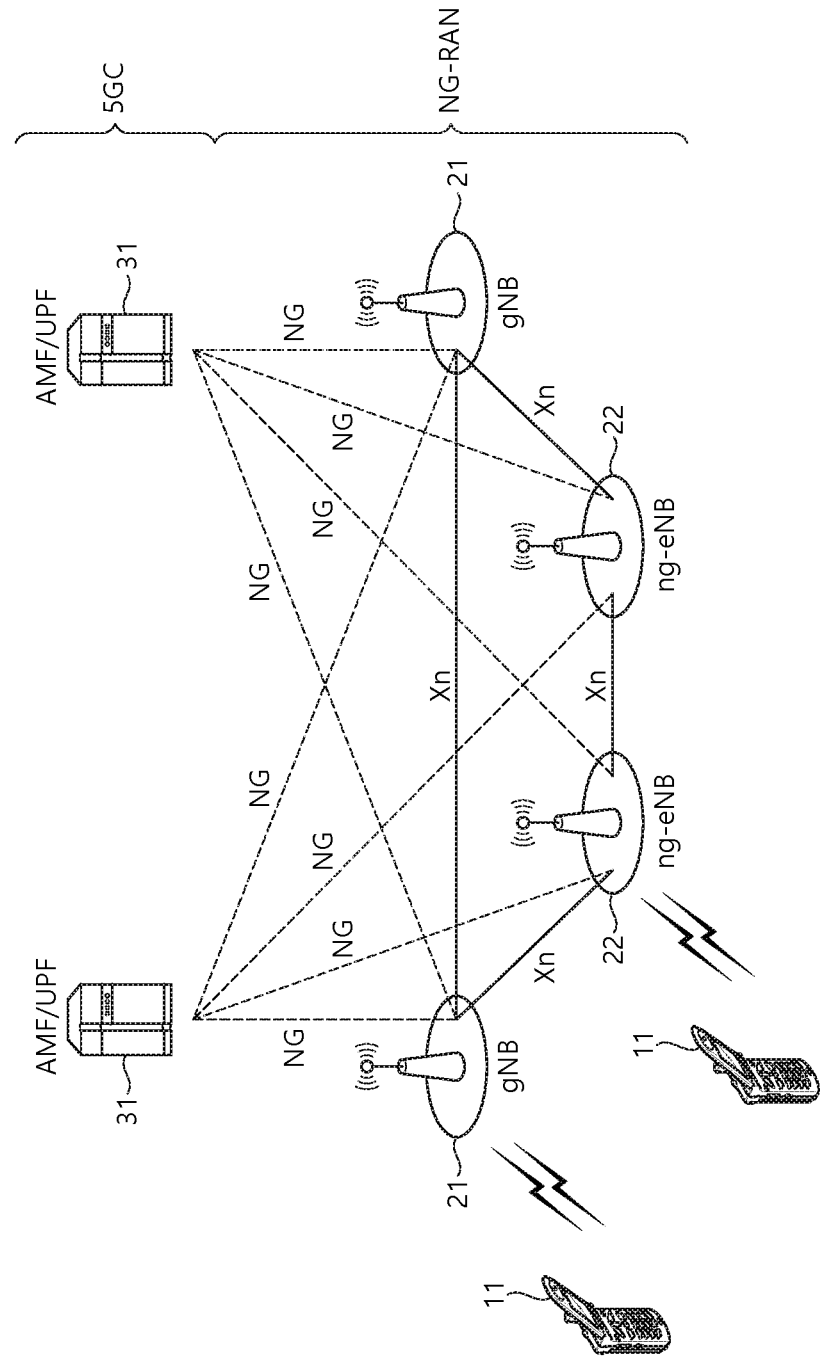
FIG. 2 shows another example of a wireless communication system to which technical features of the present disclosure can be applied.

FIG. 2 shows another example of a wireless communication system to which technical features of the present disclosure can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g., $\mu=0$, 1 . . . 4) may be represented as a first subcarrier spacing, a second subcarrier spacing . . . Nth subcarrier spacing. Referring to Table 1, transmission of user data (e.g., physical uplink shared channel (PUSCH), physical downlink shared channel (PDSCH)) may not be supported depending on the subcarrier spacing. That is, transmission of user data may not be supported only in at least one specific subcarrier spacing (e.g., 240 kHz).

In addition, referring to Table 1, a synchronization channel (e.g., a primary synchronization signal (PSS), a secondary synchronization signal (SSS), a physical broadcast channel (PBCH)) may not be supported depending on the subcarrier spacing.

That is, the synchronization channel may not be supported only in at least one specific subcarrier spacing (e.g., 60 kHz).

In NR, a number of slots and a number of symbols included in one radio frame/subframe may be different according to various numerologies, i.e., various subcarrier spacings. Table 2 shows an example of a number of OFDM symbols per slot, slots per radio frame, and slots per subframe for normal cyclic prefix (CP).

TABLE 2

| $\mu$ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 3:
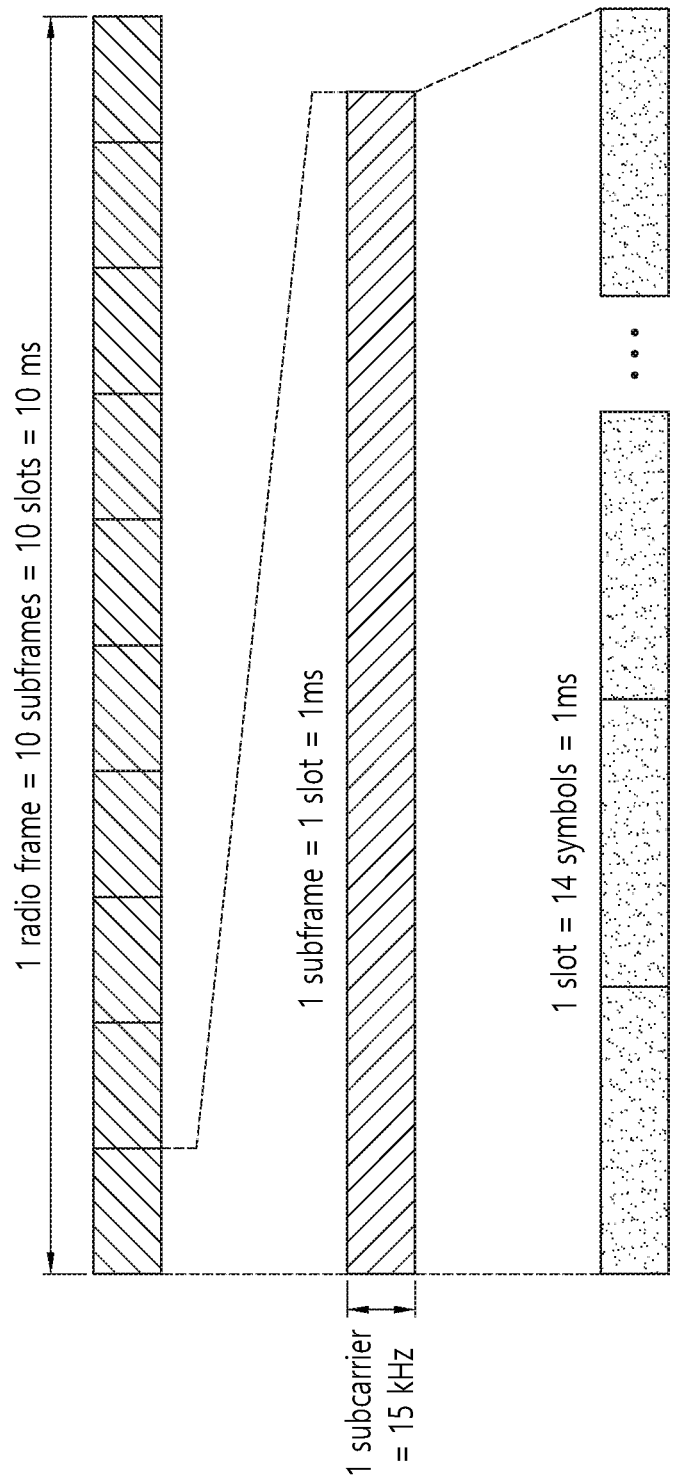
FIG. 3 shows an example of a frame structure to which technical features of the present disclosure can be applied.

Referring to Table 2, when a first numerology corresponding to $\mu=0$ is applied, one radio frame includes 10 subframes, one subframe corresponds to one slot, and one slot consists of 14 symbols. In the present disclosure, a symbol refers to a signal transmitted during a specific time interval. For example, a symbol may refer to a signal generated by OFDM processing. That is, a symbol in the present disclosure may refer to an OFDM/OFDMA symbol, or SC-FDMA symbol, etc. A CP may be located between each symbol. FIG. 3 shows an example of a frame structure to which technical features of the present disclosure can be applied. In FIG. 3, a subcarrier spacing is 15 kHz, which corresponds to $\mu=0$.

Figure 4:
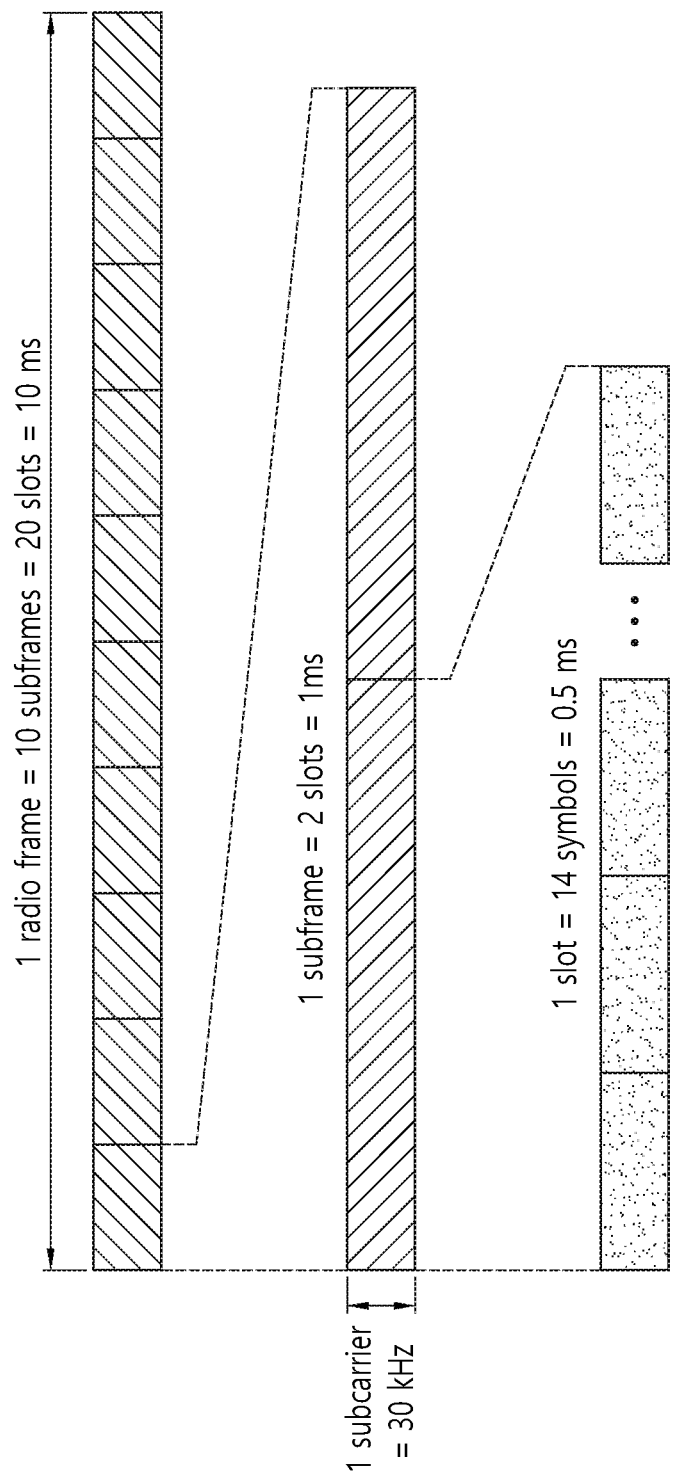
FIG. 4 shows another example of a frame structure to which technical features of the present disclosure can be applied.

FIG. 4 shows another example of a frame structure to which technical features of the present disclosure can be applied. In FIG. 4, a subcarrier spacing is 30 kHz, which corresponds to $\mu=1$.

Meanwhile, a frequency division duplex (FDD) and/or a time division duplex (TDD) may be applied to a wireless communication system to which embodiments of the present disclosure is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 3 shows an example of a slot format which is identified by a corresponding format index. The contents of the Table 3 may be commonly applied to a specific cell, or may be commonly applied to adjacent cells, or may be applied individually or differently to each UE.

TABLE 3

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| . . . | | | | | | | | | | | | | | |

For convenience of explanation, Table 3 shows only a part of the slot format actually defined in NR. The specific allocation scheme may be changed or added. The UE may receive a slot format configuration via a higher layer signaling (i.e., radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
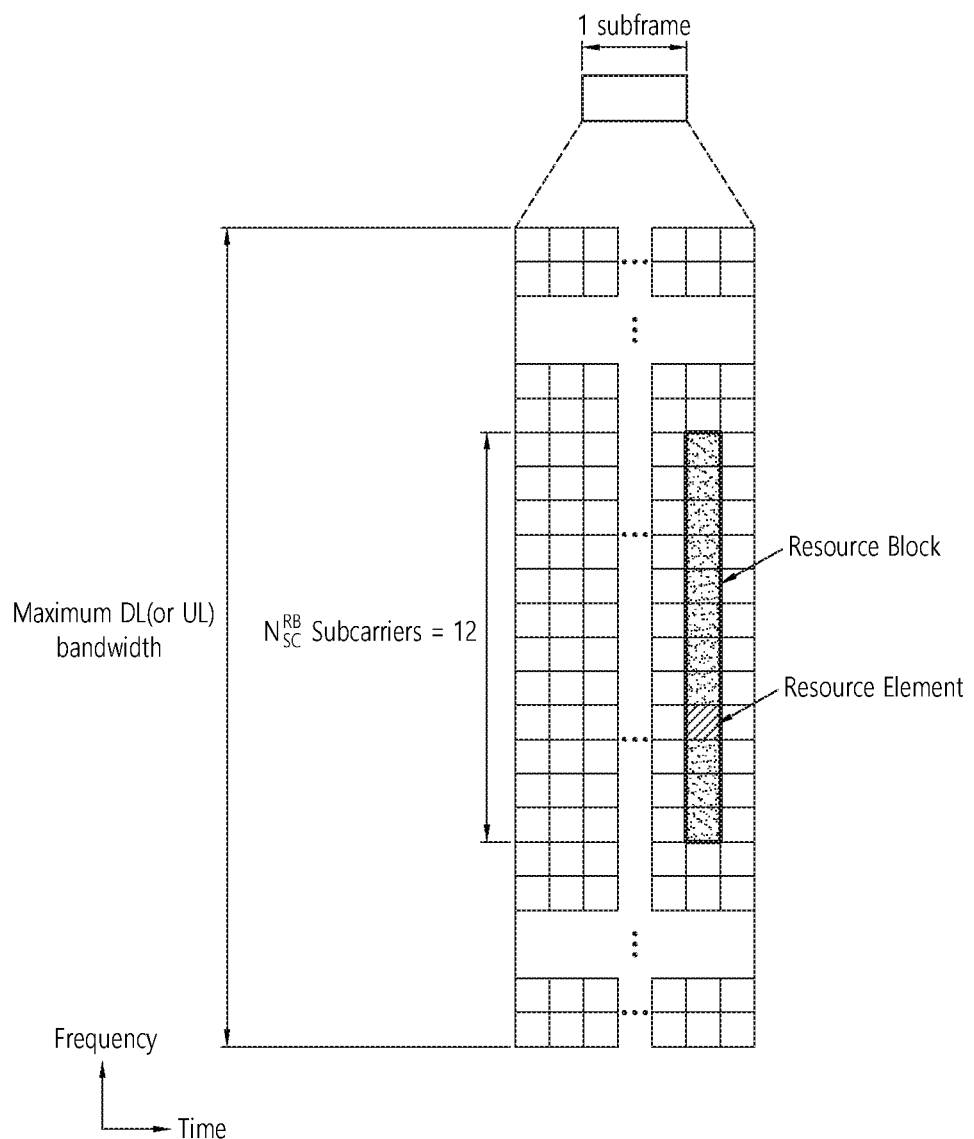
FIG. 5 shows an example of a resource grid to which technical features of the present disclosure can be applied.

FIG. 5 shows an example of a resource grid to which technical features of the present disclosure can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
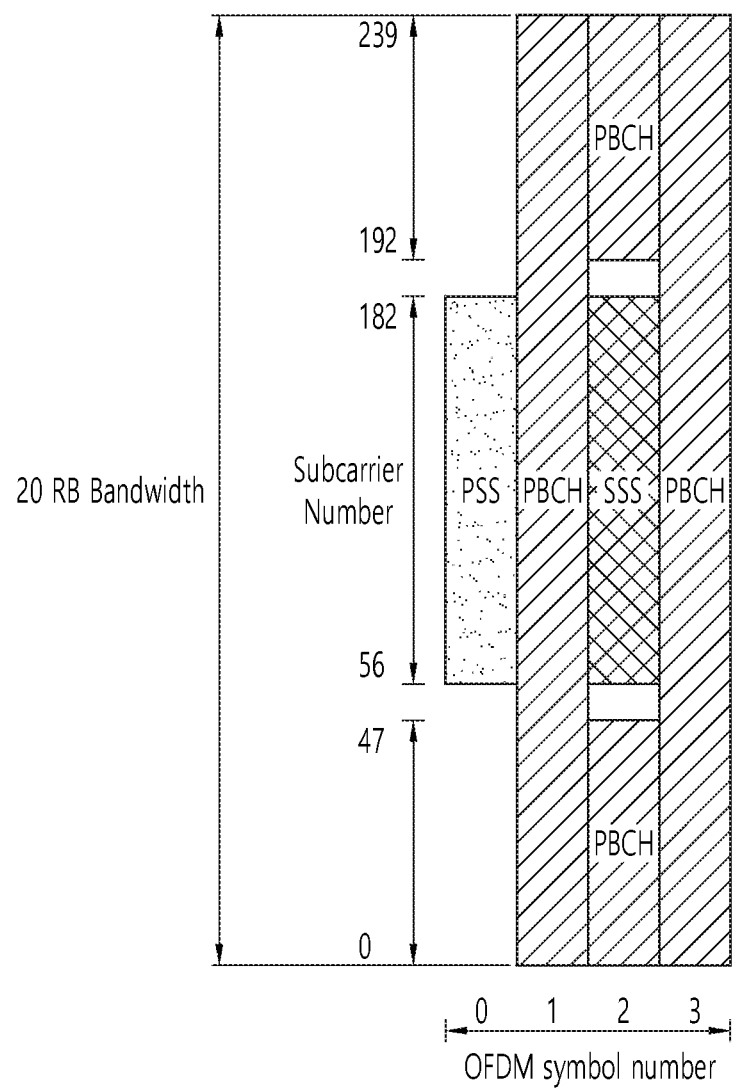
FIG. 6 shows an example of a synchronization channel to which technical features of the present disclosure can be applied.

FIG. 6 shows an example of a synchronization channel to which technical features of the present disclosure can be applied. Referring to FIG. 6, the PSS and SSS may include one symbol and 127 subcarriers. The PBCH may include 3 symbols and 240 subcarriers.

The PSS is used for synchronization signal/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g., random access operations). The SS/PBCH block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e., PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g., information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e., one RB transmitted through one OFDM symbol. Each REG includes a DM-RS. One CCE includes a plurality of REGs (e.g., 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g., up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
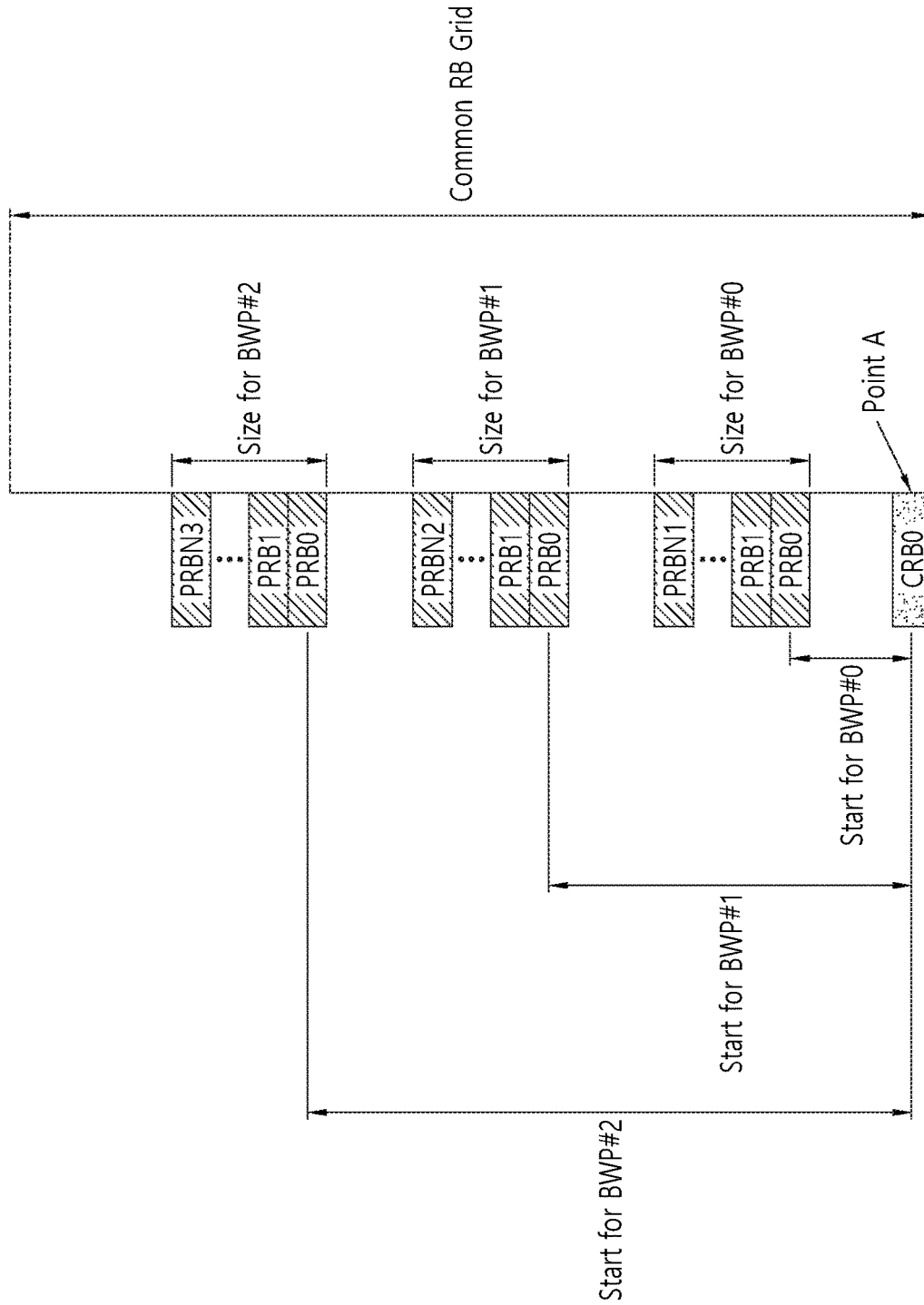
FIG. 7 shows an example of a frequency allocation scheme to which technical features of the present disclosure can be applied.

FIG. 7 shows an example of a frequency allocation scheme to which technical features of the present disclosure can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e., SIB1).

Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g., primary cell (PCell)). A plurality of BWPs may be configured for each cell individually or commonly.

Referring to FIG. 7, each BWP may be defined by a size and starting point from CRB0. For example, the first BWP, i.e., BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g., one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
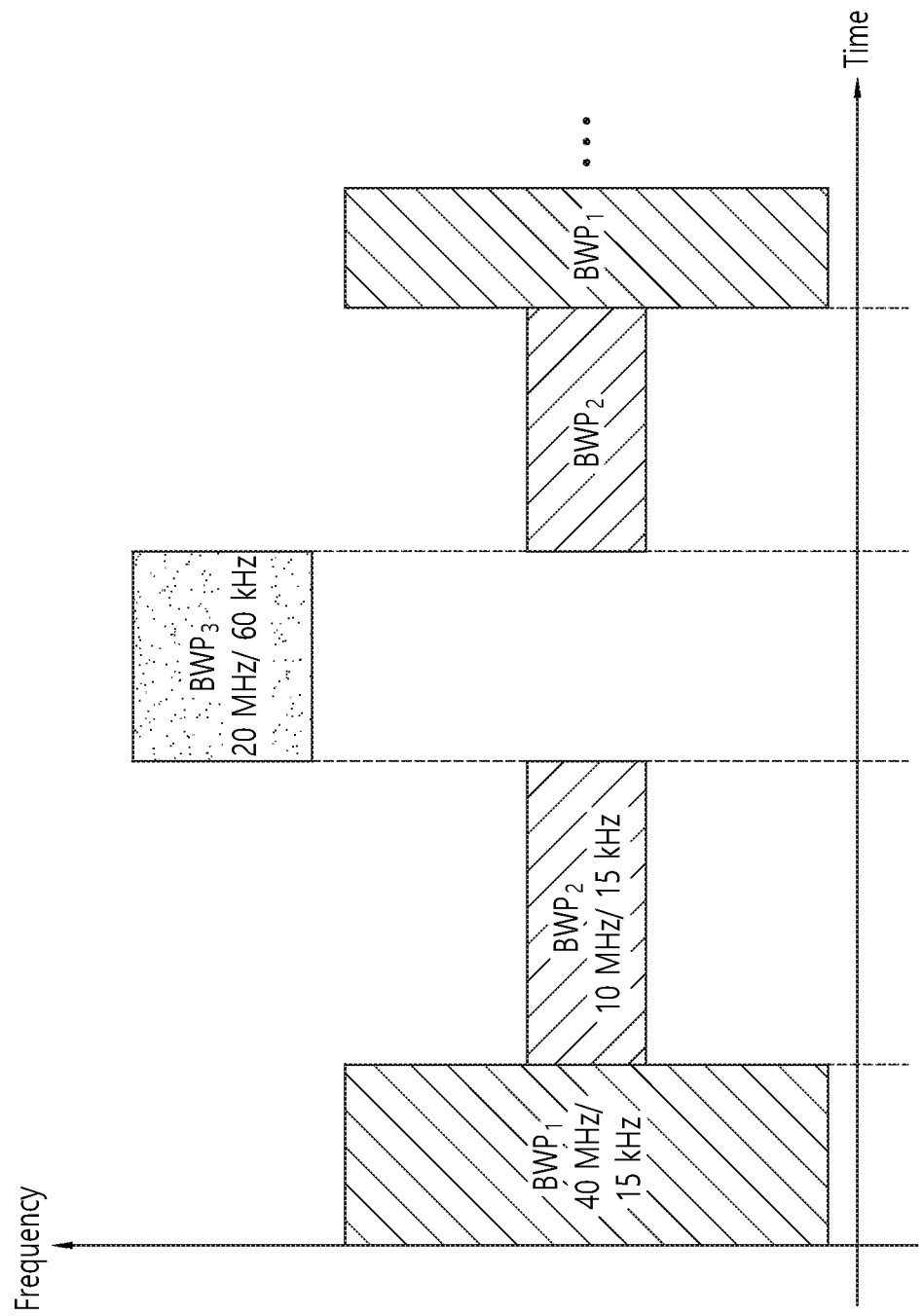
FIG. 8 shows an example of multiple BWPs to which technical features of the present disclosure can be applied.

FIG. 8 shows an example of multiple BWPs to which technical features of the present disclosure can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Hereinafter, various aspects associated with resource allocation in NR proposed by the present disclosure according to an embodiment of the present disclosure will be described.

1. Resource Allocation Through Slots and/or Mini-Slots

In NR, different time intervals, for example, slots and/or mini-slots, may be supported for monitoring data and/or control signals. In slot-based scheduling, single slot scheduling and/or multiple slot scheduling and/or cross slot scheduling can be supported. Similar to the slot-based scheduling, single mini-slot scheduling and/or multiple mini-slot scheduling and/or cross mini-slot scheduling (e.g., cross OFDM symbol scheduling) may be supported in mini-slot based scheduling. When the above scheduling methods are mixed, it is necessary to clarify UE operation. In particular, it is necessary to clarify UE operations when scheduling based on different time intervals, that is, slot-based scheduling and mini-slot-based scheduling collide with each other.

Before discussing the collision, the structures of slot-based scheduling and mini-slot-based scheduling will be described. At least one of the following several approaches may be considered.

(1) Approach 1: Common Approach

In Approach 1, slot-based scheduling and mini-slot-based scheduling may only be performed based on the scheduling of the network. The UE may be configured with one slot or multiple slots for control channel monitoring. The UE may be scheduled with a slot or a mini-slot in each scheduling. At this point, there may be some limitation in relation to scheduling. For example, in terms of the position of a PDSCH, similar to the position of a PUCCH resource, fully flexible resource allocation (e.g., a start symbol+an interval) and/or semi-flexible resource allocation (e.g., a resource selected from a set of preconfigured resources) may be considered.

A CORESET configured in the middle of a slot may schedule data that does not leave the slot. This limitation may only be applied to single mini-slot scheduling and/or cross mini-slot scheduling. That is, the start and/or last symbols of the mini-slot PDSCH or mini-slot PUSCH cannot leave the slot. However, in multiple mini-slot scheduling, data may be scheduled out of a slot. In this case, one of the following options may be considered.

Option 1: The position of the start and/or the last symbol for the mini-slot in the slot may be the same across the scheduled mini-slot. That is, the mini-slot may be repeated over a plurality of slots.

Option 2: Repetition and/or scheduling occurs in consecutive mini-slots. In this case, the size of the mini-slot needs to be limited to two symbols and/or seven symbols, so that the size of the slot may be a multiple of the size of the mini-slot.

In addition, it is necessary to clearly define how to deal with flexible symbols or UL symbols in the unpaired spectrum. For example, it may be assumed that all resources are contiguous and available so that a plurality of scheduled mini-slots may be configured consecutively, regardless of a paired or unpaired spectrum. Alternatively, the mini-slot may be configured except for the flexible symbol and the UL symbol for DL scheduling, and may also be configured except for the flexible symbol and the DL symbol for UL scheduling. To this end, a slot may be divided into a plurality of mini-slots, and a mini-slot including one or more flexible symbols and/or UL symbols may be excluded from repetition for DL scheduling.

Figure 9:
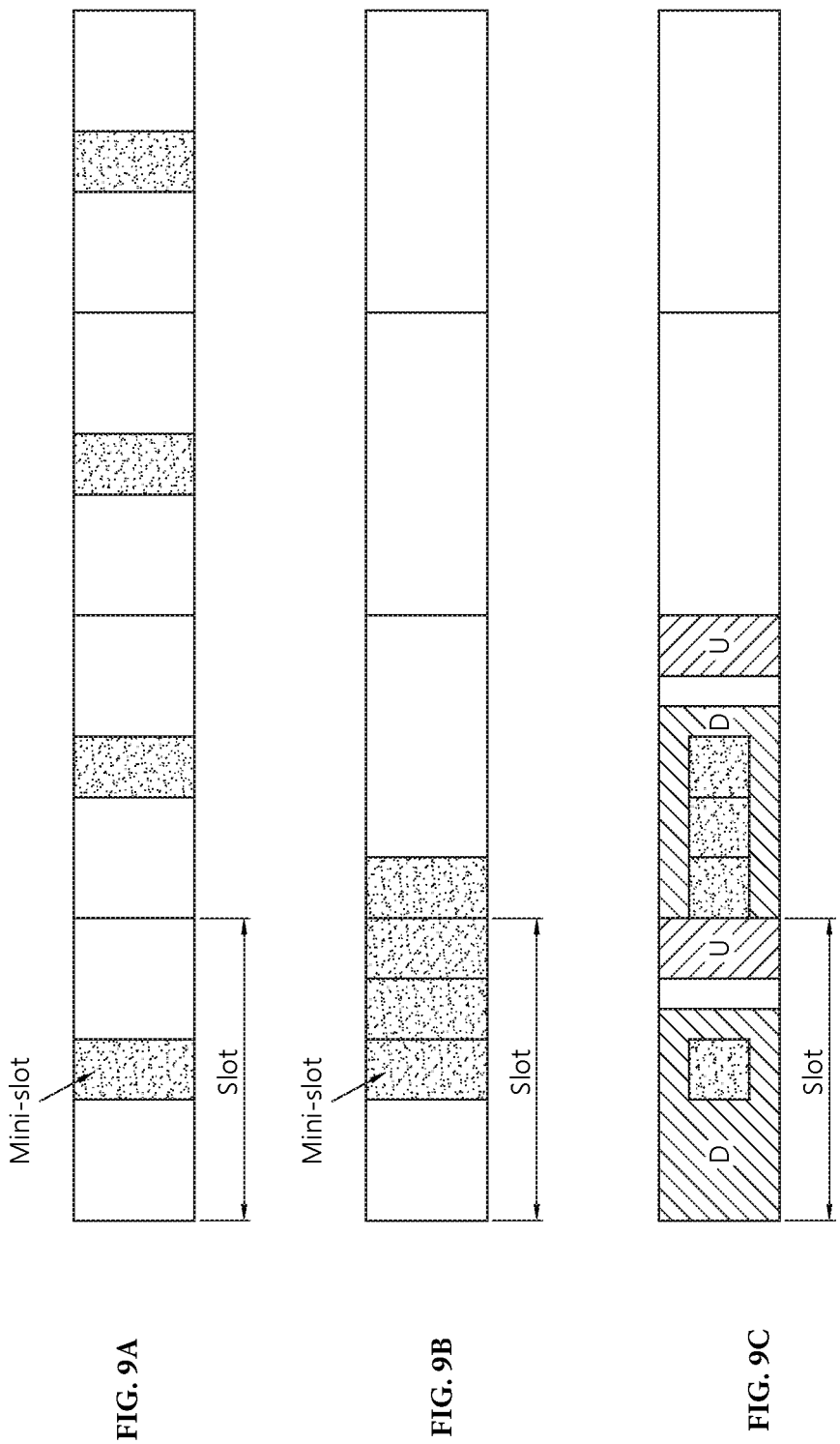
FIGS. 9A to 9C show an example of a mini-slot configuration according to an embodiment of the present disclosure.

FIGS. 9A to 9C show an example of a mini-slot configuration according to an embodiment of the present disclosure. FIG. 9A shows the case where the positions of the start and/or the last symbol for a mini-slot within a slot are the same across the scheduled mini-slots, according to Option 1 described above. That is, the mini slot is repeated over multiple slots. FIG. 9B shows the case where the mini-slots are configured to be continuously repeated, regardless of whether flexible symbols and/or UL symbols are included in the mini-slots according to Option 2 described above. At this point, all mini-slots are considered available resources. FIG. 9C shows the case where the mini-slots are configured to be continuously repeated according to whether flexible symbols and/or UL symbols are included in the mini-slots according to option 2 described above. At this point, a mini-slot including the flexible symbol and/or the UL symbol is excluded from DL scheduling, and remaining mini-slots are configured to be repeated continuously.

One or more DCIs may be scheduled in the search space (a CSS and/or a USS) based on the RNTI and/or DCI format in CORESET. However, the amount of data the UE can process depends on the UE capability. The following options may be considered as the UE's mandatory capabilities.

- It may be mandatory that the UE is capable of processing at most one PDSCH and one PUSCH in one slot for a given numerology.
- It may be mandatory that the UE is capable of processing at most one unicast PDSCH, one broadcast PDSCH, and one PUSCH in one slot for a given numerology.
- It may be mandatory that the UE is capable of processing at most two PDSCHs and one PUSCH in one slot.
- It may be mandatory that the UE is capable of processing all PDSCHs corresponding to the total transport block size (TBS) or maximum TBS that the UE can support in a given time unit and/or the maximum number of blind decoding that the UE can support in a given time unit. The time unit may be one symbol and/or several symbols and/or slots. That is, if the UE capacity for a peak data rate is not exceeded, the UE should be able to process DL data and/or UL data at any given time unit. If the peak data rate is different for each processing time in terms of processing time, when data having different processing times are multiplexed, the peak data rate corresponding to the fastest processing time may be regarded as UE capability. This is to avoid increasing the processing delay. Alternatively, the network may configure the processing time for the UE, and the UE may report to the network the peak data rate and/or maximum TBS that can be supported at a given processing time. For example, if the UE supports both slow processing time and fast processing time and the respective processing times are different in each numerology, the network may select which processing time and which numerology is used as a reference, and the network may inform the UE of the selected processing time and the selected numerology. The UE may then report to the network a UE capability such as a peak data rate and/or a maximum TBS based on the reference processing time and/or the reference numerology.
- In addition, the UE may report an additional UE capability to support more data/control signals. If the network schedules a greater number of PDSCHs and/or PUSCHs than the UE supports, transmission of one or more data channels may be omitted based on a priority.

A plurality of time intervals and PUCCH resources may be configured. The following options may be considered to support the PUCCH resources.

- The index of the PUCCH resource set and the index of the PUCCH resource in the selected PUCCH resource set may be indicated through a PUCCH resource indication in DCI. There may be a plurality of sets of PUCCH resources having different starting points and/or time intervals. For example, when a PUCCH occupying two symbols is supported, there may be 7 PUCCH resources in a slot. With regard to repetition of PUCCH resources, the number of times of repetition may be indicated through semi-static configuration signaling and/or dynamic signaling. The index of a PUCCH resource set and/or the index of a PUCCH resource in a selected PUCCH resource set may be included in a time domain indication in DCI.
- The PUCCH resource set may be semi-statically configured. In the semi-statically configured PUCCH resource set, one PUCCH resource may be selected based on an explicit indication of timing between PDSCH and PUCCH. Alternatively, in a semi-statically configured PUCCH resource set, one PUCCH resource may be selected based on an implicit indication of timing between PDSCH and PUCCH. The selected PUCCH resource may be configured with a start symbol and/or a time interval.
- A set of time resources for each slot may be configured or predetermined, and one of the time resources may be dynamically and/or semi-statically selected. The start symbol (or the start slot or the start mini slot) and/or the time interval may be dynamically selected from the selected resource.
- A set of virtual time resources (hereinafter, virtual resources) for a PUCCH may be configured, and only a set of limited virtual resources from among the set of virtual resources may be indicated according to a time domain indication (for example, a timing between PDSCH and PUCCH). In configuring a virtual resource, the same set of virtual resources may be configured in each slot, and the same pattern and/or set may be repeated across multiple slots. In order to solve UL resources that cannot be used due to sounding reference signal (SRS) resources and/or TDD or reserved resources, one or more virtual resources overlapping with unavailable PUCCH resources may be ignored. Alternatively, in configuring a virtual resource, a set of different virtual resources may be configured in each slot according to SRS configuration and/or DL/UL configuration and/or reserved resource configuration. There may be a plurality of sets of patterns, and one pattern may be selected for each slot.

Figure 10:
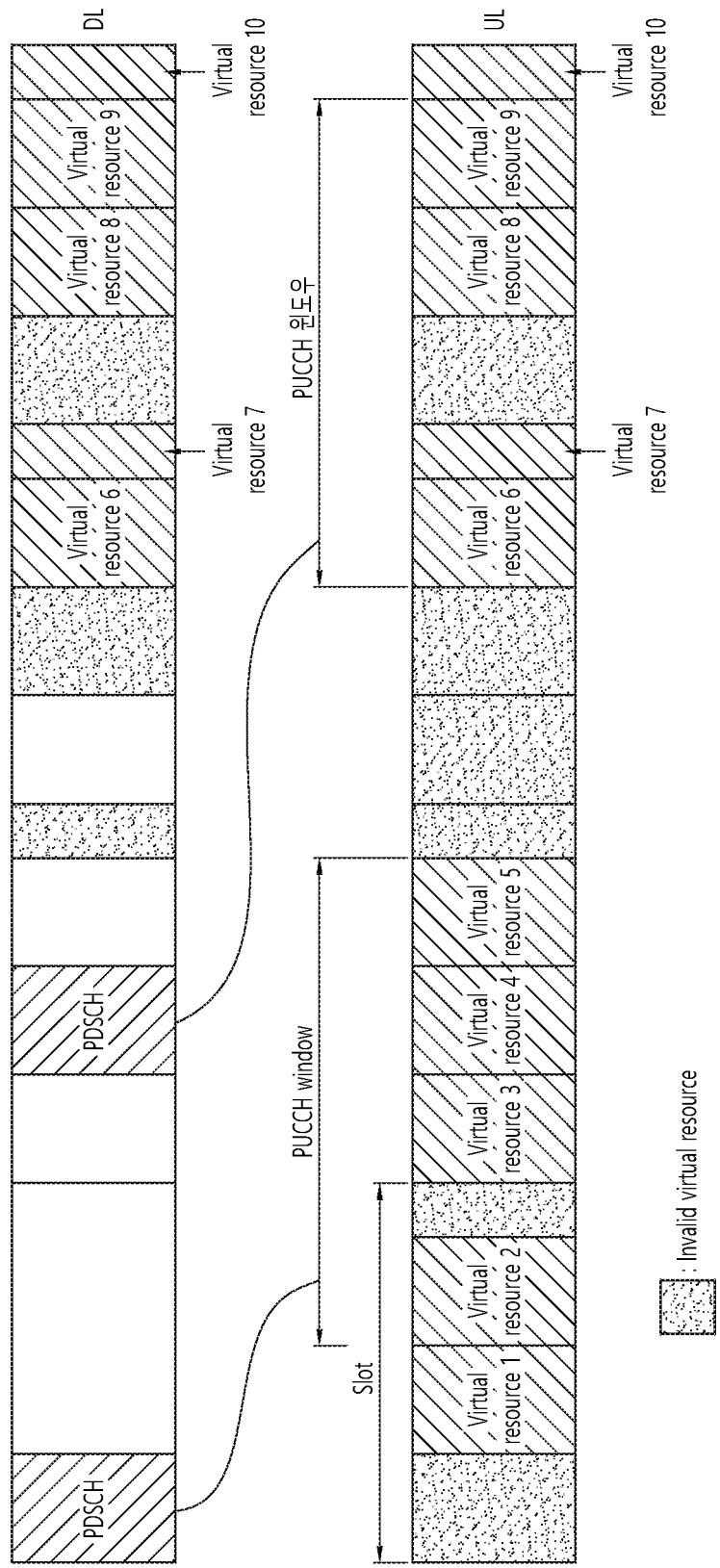
FIG. 10 shows an example of a PUCCH resource according to an embodiment of the present disclosure.

FIG. 10 shows an example of a PUCCH resource according to an embodiment of the present disclosure. Referring to FIG. 10, a set of PUCCH time resources limited by each PDSCH is indicated. An invalid virtual resource due to a reserved resource configuration and/or a DL/UL configuration is excluded from dynamically indicating a PUCCH resource. When 4 PUCCH resources are indicated, 4 valid PUCCH resources are indicated through DCI.

As valid resources for PUCCH, only semi-statically configured UL resources, or semi-statically configured UL resources and flexible resources, or semi-statically configured UL resources and UL resources dynamically indicated by a group common slot format indicator (SFI) may be considered. Which resource is included in the virtual PUCCH resources may also be configured and/or indicated by the network.

There may be a plurality of sets of virtual resources. For example, the maximum time interval of each set of virtual resources may be 2 symbols, 4 symbols, 7 symbols, and/or 14 symbols. Which virtual resource set is used for each PDSCH may be determined by any one of the following.

- For each CORESET and/or search space and/or DCI format, which virtual resource set is used for PUCCH resource selection may be semi-statically configured.
- Which virtual resource set is used for PUCCH resource selection may be dynamically selected by DCI.
  - Among the plurality of virtual resource sets including the maximum time interval and/or the start symbol, the UE may be configured with a limited number of virtual resource sets for each slot and/or K slots, and one or more virtual resources may be dynamically selected from the limited number of virtual resource sets.

(2) Approach 2: Fixed Slot and Mini Slot Structure

Approach 1 described above may be used when the UE is scheduled on a limited number of data channels in a given slot or when the UE supports a single use case. On the other hand, Approach 2 may be used when the UE supports a plurality of use cases. Alternatively, the network may configure either Approach 1 or Approach 2 through cell specific signaling and/or UE-specific common signaling and/or UE-specific signaling.

(3) Approach 3: Virtual Resource Set-Based Approach

A hybrid approach of Approach 1 and Approach 2 may be considered. That is, which virtual resource set is used for the resource allocation may be indicated through semi-static signaling and/or dynamic signaling.

FIGS. 11A to 11D show an example of different virtual resource sets for different mini-slots, etc., according to an embodiment of the present disclosure. FIG. 11A shows an example of a virtual resource set when the length of a mini-slot is 2 symbols. FIG. 11B shows an example of a virtual resource set when the length of the mini-slot is 4 symbols. FIG. 11C shows an example of a virtual resource set when the length of the mini-slot is 7 symbols. FIG. 11D shows an example of a virtual resource set when the length of a mini-slot is 2 symbols. The virtual resource set may be configured on semi-static DL/UL resources for each of DL and UL. Whether to configure a virtual resource set including a flexible resource may be configured by the network.

Further, even when mini-slots include the same number of symbols, a plurality of different virtual resource sets may be configured.

Figure 12A:
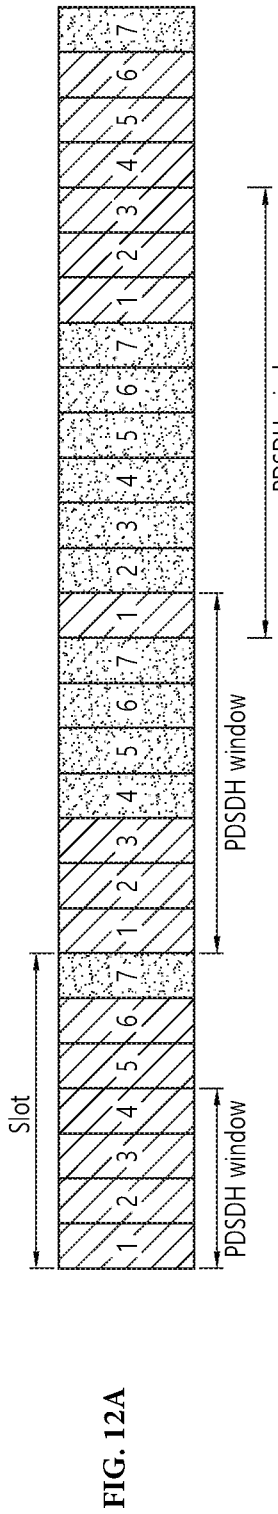
FIGS. 12A to 12C show an example of a plurality of virtual resource sets according to an embodiment of the present disclosure.
Figure 12B:
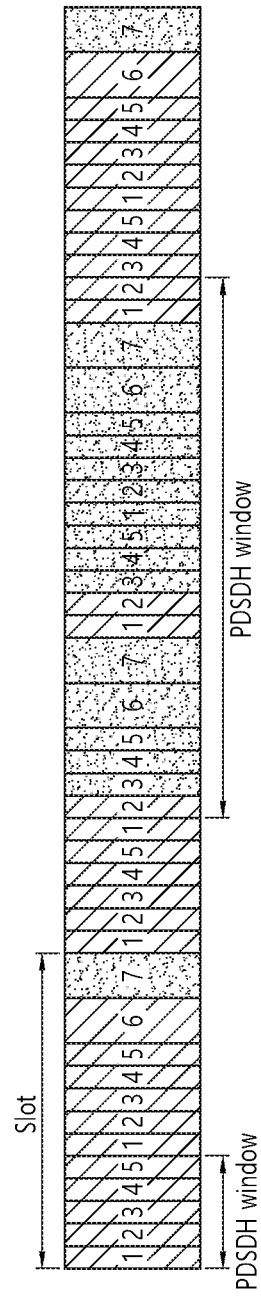
Figure 12C:
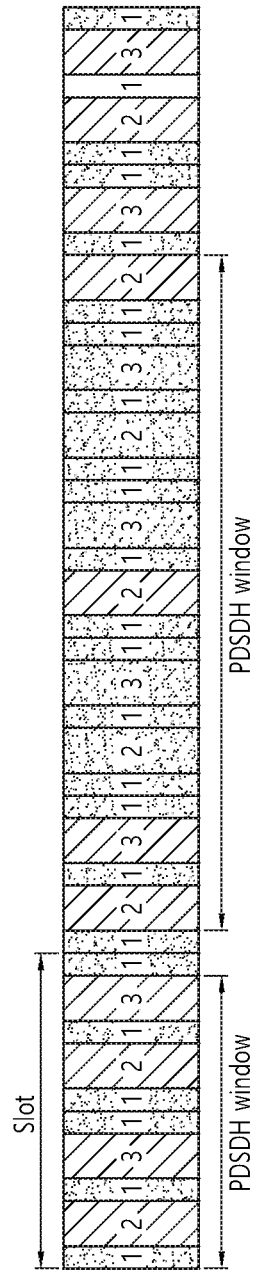

FIGS. 12A to 12C show an example of a plurality of virtual resource sets according to an embodiment of the present disclosure. FIG. 12A, FIG. 12B, and FIG. 12C show examples of a virtual resource set when the length of a mini-slot is 2 symbols. However, each virtual resource set is configured differently.

In summary, one embodiment of the present disclosure described above is as follows.

A plurality of virtual resource sets may be predefined or configured for each mini-slot.

The mini-slot interval or the selected virtual resource set may be semi-statically configured and/or dynamically indicated by DCI. At least for common data such as a broadcast channel, a fixed virtual resource set may be predefined. For example, a virtual resource set in which a virtual resource aligned with an SS/PBCH block is fixed may be predefined. The virtual resource set may be predefined based on a slot structure and/or a different signal (e.g., SS/PBCH block). Alternatively, the virtual resource set may be uniformly defined (e.g., 7 virtual resources each occupying 2 symbols are configured in one slot) or may be flexibly defined (e.g., all symbols are starting symbols of the virtual resources). Alternatively, the virtual resource set may follow other formats (e.g., a short TTI format of LTE).

In slot-based scheduling, a virtual resource may be a slot.

In indicating a time-domain resource, a set of virtual resources may be indicated by DCI regardless of whether the virtual resources are available or not. Invalid virtual resources may be ignored. This does not cause any ambiguity between the network and the UE.

Alternatively, a set of valid virtual resources may be indicated by DCI. In determining an effective virtual resource by a dynamic SFI transmitted on a group common PDCCH, a flexible resource may be regarded as a valid virtual resource, regardless of the SFI transmitted on the group common PDCCH. Even if a valid resource is changed to a UL resource by the SFI and hence it is not available in the DL, the SFI transmitted through the group common PDCCH may still indicate the resource to avoid any ambiguity between the network and the UE. Alternatively, when a group common PDCCH is configured, only valid DL resources and/or UL resources may be considered valid virtual resources. The ambiguity that could occur in this case may be handled in a HARQ-ACK procedure. When a group common PDCCH is not configured, DL resources and/or flexible resources may be used as valid virtual resources in DL, and UL resources and flexible resources may be used as valid virtual resources in UL. If a group common PDCCH is configured and the network does not configure the dynamic change of a flexible resource to a DL resource or a UL resource, the UE may only use a semi-statically configured DL resource and/or UL resource as a valid virtual resource in DL and a valid virtual resource in UL, respectively.

Multi-slot scheduling and/or multiple mini-slot scheduling may be handled similarly. At this point, each virtual resource may correspond to one slot and/or one mini-slot.

A similar framework may be used for PDSCH resources, PUSCH resources and/or PUCCH resources. A virtual resource set may define a set of consecutive symbols, and one DCI may indicate the starting point and time interval of a PDSCH, a PUSCH, and/or a PUCCH. A plurality of virtual resource sets may be indicated for multiple slot scheduling and/or multiple mini-slot scheduling. A virtual resource may be a set of slots in a radio frame, a set of mini-slots in a slot, a set of mini-slots in a radio frame, or a set of symbols in a radio frame.

In addition, a different virtual resource set may be configured for each PUCCH format. For example, different virtual resource sets may be configured for a short PUCCH format and a long PUCCH format. Different virtual resource sets may be used according to the selection of the PUCCH format.

2. Semi-Static Codebook and Time Domain Table

When the UE is configured with the time domain table and the UE supports one or more PDSCHs in one slot, the UE needs to transmit one or more HARQ-ACK bits per CC in the assumption that HARQ-ACK is transmitted per slot. At this point, since there may be time domain resources overlapping each other, it is necessary to clearly define how to determine the size of the codebook for HARQ-ACK.

For example, when time domain resources include [1, 2, 3, 4], [5, 6, 7], [8, 9, 10, 11, 12], [1, 2], [3, 4], [5, 6, 7], and [8, 9] and the UE is scheduled on [5, 6, 7], it is necessary to clearly determine where the corresponding data is scheduled. If the size of the HARQ-ACK codebook is determined based on the maximum time-domain resource allocation that does not completely overlap, it may be calculated into four opportunities of [1, 2], [3, 4], [5, 6, 7], and [8, 9, 10, 11, 12] in this embodiment. For each time-domain entry, the HARQ-ACK bit among the 4 bits needs to be clearly determined. When multiple bits are used for a multiple-input multiple-output (MIMO) or a TB, the HARQ-ACK bit may be doubled or the maximum number of codewords may be additionally determined for each time-domain entry.

The HARQ-ACK bit order K in the slot is set to 1 by default. If there is a time domain opportunity starting from each symbol I, the HARQ-ACK bit for the corresponding time-domain entry is carried and transmitted on the Kth bit and K increases. In addition, I increases.

In the above-described embodiment, [1, 2] is mapped to the first bit, [3, 4] is mapped to the second bit, and [8, 9] is mapped to the fourth bit. For each PDSCH, when the PDSCH starts at the symbol m, the symbol m is mapped to the Kth bit. In cross-slot scheduling or multi-slot scheduling, this may be actually performed in the slot to which the PDSCH is mapped. For example, if cross-slot scheduling indicates 2 slots, a corresponding PDSCH resource set may be used. For example, if the DL association set is [1, 2, 3, 4] and CORESET monitoring can occur in every slot, the DL association set may be fixed to [1, 2, 3, 4] before the HARQ-ACK slot. In order to count the number of non-overlapping PDSCHs in a slot, PDSCHs scheduled by cross-slot scheduling should be also considered. For example, the n−4th slot may be considered a cross slot PDSCH when a PDSCH and a cross slot entry of the same slot exist. In multi-slot scheduling, the last PDSCH and/or the last transmission opportunity may be used. For example, when a plurality of slots is 4 slots, the PDSCH of the 4th slot may be used to count the number of non-overlapping PDSCHs in the slot.

In order to further reduce the size of the HARQ-ACK codebook, the size of the codebook may be calculated for each slot, and, in this case, the UE may assume that there is no DL transmission in symbols that are not semi-statically configured DL symbols and/or flexible symbols. That is, the UE may calculate the size of the HARQ-ACK codebook by considering only the semi-statically configured DL symbol and/or flexible symbol. Otherwise, all slots may be DL symbols and/or flexible symbols. In multi-slot scheduling, the timing of K1 may start at the last slot regardless of the actual transmission. Alternatively, K1 may start at the last slot among a plurality of slots each requiring dynamic calculation of the size of the HARQ-ACK codebook.

The above description assumes that the UE is not scheduled with the PDSCH not overlapping in any symbol and that the network does not have any ambiguity. However, there are some cases where ambiguity may occur. For example, the transmission opportunities may include [1, 2, 3, 4], [5, 6, 7], [8, 9, 10, 11, 12], [1, 2], [3, 4, 5], [6, 7], and [7, 8, 9]. In this case, the maximum non-overlapping PDSCH may be [1, 2, 3, 4,], [5, 6, 7], [8, 9, 10, 11, 12] or [1, 2], [3, 4, 5], [6, 7] or [1, 2], [3, 4, 5], [7, 8, 9]. Therefore, it is necessary to determine a HARQ-ACK bit based on the combination at each transmission opportunity, and the maximum PDSCH may be scheduled including the indicated transmission opportunity. For example, [5, 6, 7] may be mapped to the second bit with assuming the worst case. However, in the case where the UE transmits a plurality of slots, since all bits will be configured as non-acknowledgement (NACK) if there is no indication that DCI has been received, it is difficult to determine whether the UE has received or not received DCI. For example, if the network transmits [8, 9, 10, 11, 12] and the UE has not received the DCI, the UE will transmit a 3-bit NACK, but this may be difficult to be easily distinguished by the network.

In summary, the HARQ-ACK bit may be determined based on a maximum combination including one or more PDSCHs scheduled in a given slot. Otherwise, the maximum value of all combinations may be used. The bit order may also be determined based on the selected combination. Therefore, the UE needs to maintain a list of combinations. In the meanwhile, in determining a bit index, for each time-domain resource allocation entry, the maximum number M of PDSCHs scheduled in symbols 0 to L−1 may be calculated, and the bit index may be determined as M+1. L is a symbol index at which a corresponding time-domain resource allocation entry starts.

The overall algorithm is as follows. For each time-domain entry P, the maximum number M of non-overlapping PDSCHs ending before the start symbol P may be calculated, and the HARQ-ACK bit order for P may be determined as M+1. The size of the codebook in a corresponding slot may be determined as [maximum value of M for all P]+1.

When the PDSCHs overlap one another, K=0 is set, and, if there is a time-domain entry perceived at each symbol I, K increases. K is determined as a HARQ-ACK bit in the slot. At this point, a cross slot is not considered a potential starting PDSCH in a given slot. Meanwhile, this may be used regardless of whether or not the PDSCHs overlap, and, in this case, the UE may inform NACK when overlapping PDSCHs are omitted. For example, if [1, 2, 3, 4, 5] and [5, 6, 7, 8] entries are available and the maximum number of non-overlapping PDSCHs is 1, the codebook size may be 1. However, if the both are scheduled, the UE may omit either. If the network schedules the both and the UE indicates 1 and the UE misses DCI, there may be ambiguity as to which one is scheduled. In this case, 2 bits may be used.

The above-described method may be extended even when a non-slot-based PUCCH is scheduled and a DL association set is defined as a non-slot rather than a slot. Within the non-slot, a similar method may be applied.

3. Basic Timing Table

When the UE is configured with a basic timing table based on RMSI/OSI (other SI), it should be clearly defined how the corresponding basic timing table is applied. Regarding this, the following options may be considered.

The basic timing table may only be used for data scheduled by CORESET 0. A UE-specifically configured time domain table may be used in other cases (e.g., data scheduled by a different CORESET other than CORESET 0).

A timing table configured by RMSI may be used only for CSS 2 and USS (e.g., for random access response (RAR) and unicast data). On the other hand, the basic timing table may be used for other cases (e.g., CSS 0/1/3) for RMSI/OSI/paging.

The timing table configured by RMSI may be used for all data scheduled by CORESET 0 or CORESET X when CORESET configuration pattern #1 is used. If CORESET 0 or CORESET X uses a different CORESET pattern, the timing table configured by RMSI may only be used for CSS 2 and USS (e.g., for RAR and unicast data). That is, when beam sweeping is used, SI/paging may be scheduled based on the basic timing table, while other data may be scheduled based on different time-domain resource allocation from RMSI. To this end, the RSI table may be overwritten by a UE-specific resource allocation configuration.

A CSS configured with a CORESET other than CORESET 0 may follow a timing table configured by RMSI, and a UE-specific configuration may be used for a USS.

A CSS for SI/paging may follow a timing table configured by RMSI or the basic timing table, and a CSS for RAR/C-RNTI (cell radio network temporary identifier) may use a UE-specific resource allocation table.

When a CORESET for scheduling SI/paging is configured based on a CORESET configuration pattern #1, #2, or #3 (that is, a beam sweeping configuration), a CSS for SI/paging may follow the basic timing table. Otherwise, a timing table configured by RMSI or a UE-specific timing table may be used.

A CORESET pattern may be used to configure a different CORESET in a different DL BWP for beam sweeping. In particular, for a CORESET used for PDCCH order or beam failure recovery, a pattern identical or similar to the CORESET configuration pattern #1, #2 or #3 may be reused.

4. Frequency and Time-Domain Resource Allocation for MSG3 Transmission

When MSG3 of the random access procedure is allocated to a BWP other than the initial UL BWP, the frequency-domain resource allocation for MSG3 transmission, i.e., the starting position, a bandwidth size and/or frequency range, etc., needs to be clearly determined. In addition, bandwidth information is needed to determine frequency-domain resource allocation for the MSG3 transmission. In addition, it is necessary to clearly determine whether the basic timing table is used for time-domain resource allocation for the MSG3 transmission. The basic timing table may be predetermined or may be configured by RMSI. With regard to the frequency-domain resource allocation, the following options may be considered.

- The frequency location and bandwidth for the MSG3 transmission may be determined based on an active UL BWP of the UE. Whether the network knows whether UEs sharing the same UL BWP share the same RACH resource needs to be clearly determined at least in a contention-free random access procedure. This option may be used in the contention-free random access procedure in which PUSCH is scheduled by an RAR.
- The frequency location and bandwidth for the MSG3 transmission may be determined based on an initial UL BWP of the UE. The advantage of this option is that the MSG3 can be scheduled with information common between the network and the UE. More specifically, although different UL BWPs are set, there may be a plurality of UEs sharing the PRACH resource, and the MSG3 may be scheduled based on the same initial UL BWP to the plurality of UEs. The start frequency of the MSG3 transmission may be determined based on the lowest PRB index of the UE's active UL BWP (e.g., the start PRB of the active UL BWP) or the lowest PRB index of the configured RACH resource. The size of the bandwidth for the MSG3 transmission may be identical to the size of the initial UL BWP. This is based on the assumption that at least the starting point of the active UL BWP is the same for the UEs sharing the PRACH resource. In this case, the bandwidth of the frequency resource for the MSG3 transmission is adjusted to the bandwidth of the initial UL BWP, and hence, it is not necessary to set the last PRB of the active UL BWP of each UE to be the same. As a result, the network is given a degree of freedom in setting the active UL BWP.
- The frequency location and bandwidth for the MSG3 transmission may be determined based on the initial DL BWP of the UE. The start frequency of the MSG3 transmission may be determined based on the lowest PRB of the active DL BWP of the UE or the lowest PRB of the configured RACH resource. The size of the bandwidth for the MSG3 transmission may be identical to the size of the initial DL BWP. More specifically, in determining the frequency-domain resource allocation for the MSG3 transmission in the active UL BWP, the frequency resource for transmission of the MSG3 may start from the first RB of the active UL BWP and span the number of RBs equal to the number of RBs in the initial UL BWP.
- The frequency location and bandwidth for the MSG3 transmission may be explicitly configured. Alternatively, the bandwidth for the MSG3 transmission may be fixed in advance. The bandwidth for the MSG3 transmission may be different for each frequency range or may be different for each RACH configuration (e.g., a PRACH type). When the bandwidth for the MSG3 transmission is fixed in advance, the frequency location for the MSG3 transmission may be determined as the starting point of the active UL BWP and/or the starting point of the PRACH resource, or a fixed DL-UL gap may also be considered.

When both a UL carrier and a supplemental UL (SUL) carrier are configured in a cell, whether the MSG3 is transmitted through the UL carrier or the SUL carrier may be determined by PRACH unless otherwise indicated. For example, the MSG3 may be transmitted along the carrier on which the PRACH preamble is transmitted. Therefore, in this case, the frequency-domain resource allocation may be determined based on the active UL BWP and/or the initial UL BWP in the carrier on which the PRACH preamble is transmitted.

Figure 13:
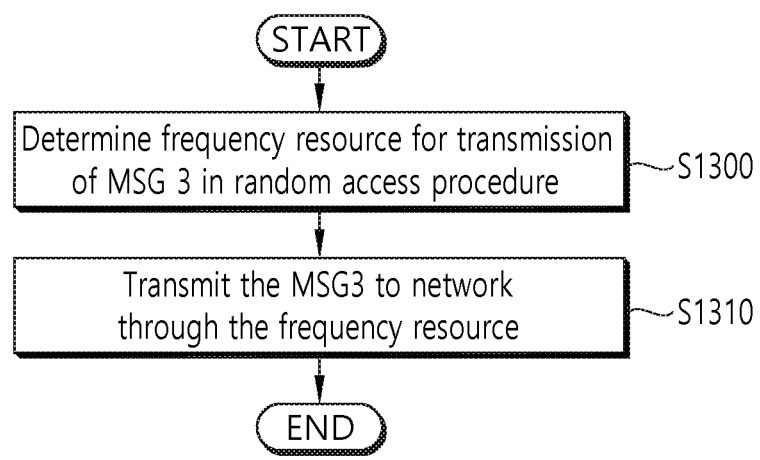
FIG. 13 shows a method for a UE to transmit MSG3 in a random access procedure according to an embodiment of the present disclosure.

FIG. 13 shows a method for a UE to transmit MSG3 in a random access procedure according to an embodiment of the present disclosure. The present disclosure described above from the perspective of the UE may be applied to this embodiment.

In step S1300, the UE determines a frequency resource for transmission of MSG3. The starting position of the frequency resource is the lowest PRB of the active UL BWP, and the bandwidth of the frequency resource is identical to the bandwidth of the initial UL BWP.

In step S1310, the UE transmits the MSG3 to the network through the frequency resource.

The active UL BWP may not include the initial UL BWP. The MSG3 may be transmitted to the network through the active UL BWP. The MSG3 may be transmitted to the network through the active UL BWP located either on the UL carrier or on the SUL carrier. The UL carrier or the SUL carrier including the active UL BWP on which the MSG3 is transmitted may be identical to the carrier on which a random access preamble is transmitted.

According to an embodiment of the present disclosure described in FIG. 13, a frequency resources for the MSG3 transmission in the random access procedure may be effectively determined. In particular, when the active UL BWP does not include the initial UL BWP, the transmission of the MSG3 through the active UL BWP may be performed based on the initial UL BWP.

Figure 14:
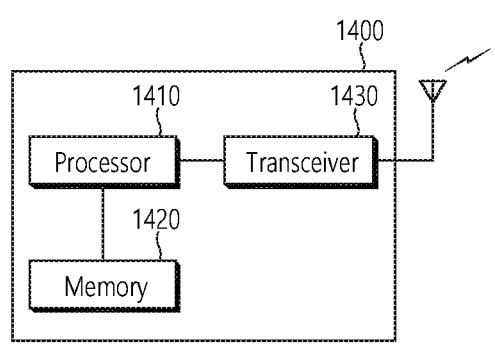
FIG. 14 shows a UE to which an embodiment of the present disclosure is implemented.

FIG. 14 shows a UE to which an embodiment of the present disclosure is implemented. The present disclosure described above from the perspective of the UE may be applied to this embodiment.

A UE 1400 includes a processor 1410, a memory 1420, and a transceiver 1430. The processor 1410 may be configured to implement the functions, processes, and/or methods described in the present disclosure. Layers of radio interface protocol may be implemented within the processor 1410. More specifically, the processor 1410 determines a frequency resource for transmission of MSG3 in a random access procedure, and controls the transceiver 1430 to transmit the MSG3 to the network through the frequency resource. The starting position of the frequency resource is the lowest PRB of the active UL BWP, and the bandwidth of the frequency resource is identical to the bandwidth of the initial UL BWP.

The active UL BWP may not include the initial UL BWP. The MSG3 may be transmitted to the network through the active UL BWP. The MSG3 may be transmitted to the network through the active UL BWP located on either the UL carrier or the SUL carrier. The UL carrier or the SUL carrier including the active UL BWP on which the MSG3 is transmitted may be identical to the carrier on which a random access preamble is transmitted.

The memory 1420 is connected to the processor 1410 to store various types of information for driving the processor 1410. The transceiver 1430 is connected to the processor 1410 to transmit and/or receive radio signals.

The processor 1410 may include an application-specific integrated circuit (ASIC), other chipsets, logic circuits, and/or data processing devices. The memory 1420 may include a read-only memory (ROM), a random access memory (RAM), a flash memory, a memory card, a storage medium, and/or other storage devices. The transceiver 1430 may include a baseband circuit for processing radio frequency signals. When the embodiment is implemented in software, the above-described technique may be implemented using a module (a process, a function, etc.) which performs the above-described function. The module may be stored in the memory 1420 and may be executed by the processor 1410. The memory 1420 may be inside or outside the processor 1410 and may be connected to the processor 1410 by various well-known means.

According to the embodiment of the present disclosure described in FIG. 14, the processor 1410 may effectively determine a frequency resource for MSG3 transmission in a random access procedure. In particular, when the active UL BWP does not include the initial UL BWP, the transmission of the MSG3 through the active UL BWP may be performed based on the initial UL BWP.

Figure 15:
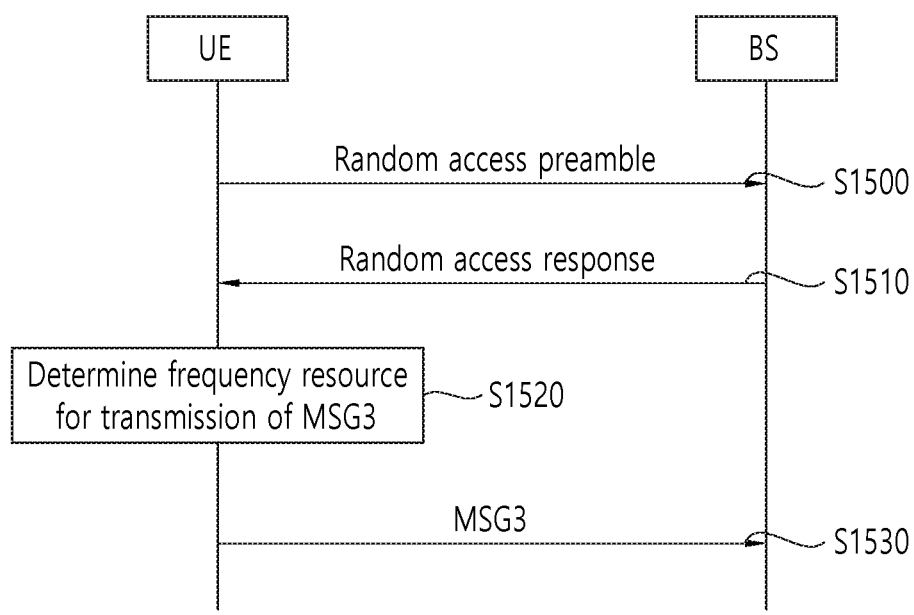
FIG. 15 shows a method for a BS and a UE to perform a random access procedure according to an embodiment of the present disclosure.

FIG. 15 shows a method for a BS and a UE to perform a random access procedure according to an embodiment of the present disclosure. The present disclosure described above from the perspective of the BS/UE side may be applied to this embodiment.

In step S1500, the UE transmits a random access preamble to the BS. In step S1510, the BS transmits a random access response, which is a response to the random access preamble, to the UE.

In step S1520, the UE determines a frequency resource for transmission of MSG3. The starting position of the frequency resource is the lowest PRB of the active UL BWP, and the bandwidth of the frequency resource is identical to the bandwidth of the initial UL BWP.

In step S1530, the UE transmits the MSG3 to the network through the frequency resource.

The active UL BWP may not include the initial UL BWP. The MSG3 may be transmitted to the network through the active UL BWP. The MSG3 may be transmitted to the network through the active UL BWP located on either the UL carrier or the SUL carrier. The UL carrier or the SUL carrier including the active UL BWP on which the MSG3 is transmitted may be identical to the carrier on which a random access preamble is transmitted.

According to the embodiment of the present disclosure described in FIG. 15, a frequency resource for MSG3 transmission in a random access procedure may be effectively determined. In particular, when the active UL BWP does not include the initial UL BWP, the transmission of the MSG3 through the active UL BWP may be performed based on the initial UL BWP.

Figure 16:
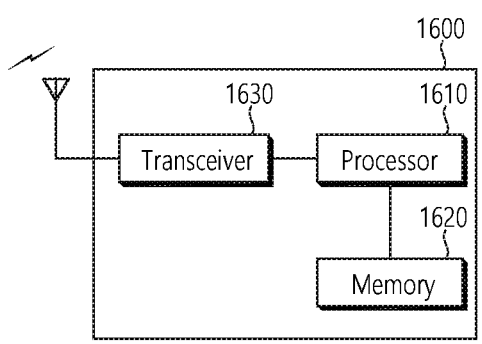
FIG. 16 shows a BS to which an embodiment of the present disclosure is implemented.

FIG. 16 shows a BS to which an embodiment of the present disclosure is implemented. The present disclosure described above from the perspective of the BS may be applied to this embodiment.

A BS 1600 includes a processor 1610, a memory 1620, and a transceiver 1630. The processor 1610 may be configured to implement the functions, processes, and/or methods described herein. Layers of air interface protocol may be implemented within the processor 1610. More specifically, the processor 1610 controls the transceiver 1630 to receive the random access preamble from the UE, controls the transceiver 1630 to transmit a random access response, which is a response to the random access preamble to the UE, and controls the transceiver 1630 to receive the MSG3 from the UE through the frequency resource for the transmission of MSG3. The starting position of the frequency resource is the lowest PRB of the active UL BWP, and the bandwidth of the frequency resource is identical to the bandwidth of the initial UL BWP.

The active UL BWP may not include the initial UL BWP. The MSG3 may be transmitted to the network through the active UL BWP. The MSG3 may be transmitted to the network through the active UL BWP located on either the UL carrier or the SUL carrier. The UL carrier or the SUL carrier including the active UL BWP on which the MSG3 is transmitted may be identical to the carrier on which a random access preamble is transmitted.

The memory 1620 is connected to the processor 1610 to store various types of information for driving the processor 1610. The transceiver 1630 is connected to the processor 1610 to transmit and/or receive radio signals.

The processor 1610 may include an ASIC, other chipsets, logic circuits, and/or data processing devices. The memory 1620 may include a ROM, a RAM, a flash memory, a memory card, a storage media, and/or other storage devices. The transceiver 1630 may include a baseband circuit for processing radio frequency signals. When the embodiment is implemented in software, the above-described technique may be implemented using a module (a process, a function, etc.) which performs the above-described function. The module may be stored in the memory 1620 and may be executed by the processor 1610. The memory 1620 may be inside or outside the processor 1610, and may be connected to the processor 1610 by various well-known means.

According to the embodiment of the present disclosure described in FIG. 16, the processor 1610 may control the transceiver 1630 to effectively receive MSG3 through a frequency resource determined in a random access procedure. In particular, when the active UL BWP does not include the initial UL BWP, the transmission of the MSG3 through the active UL BWP may be performed based on the initial UL BWP.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting MSG3 of a random access procedure by a wireless device in a wireless communication system, the method comprising:

determining a frequency resource for transmission of the MSG3 within an active uplink (UL) bandwidth part (BWP) other than an initial UL BWP, wherein the frequency resource for transmission of the MSG3 within the active UL BWP starts from a lowest physical resource block (PRB) of the active UL BWP, and wherein a bandwidth of the frequency resource for transmission of the MSG3 within the active UL BWP is determined based on a bandwidth of the initial UL BWP; and transmitting, to a network, the MSG3 through the frequency resource within the active UL BWP.

2. The method of claim 1, wherein the active UL BWP does not comprise the initial UL BWP.

3. The method of claim 1, wherein the MSG3 is transmitted to the network within the active UL BWP located either on a UL carrier or on a supplemental (SUL) carrier.

4. The method of claim 3, wherein the UL carrier or the SUL carrier comprising the active UL BWP on which the MSG3 is transmitted is identical to a carrier on which a random access preamble is transmitted.

5. The of claim 1, wherein the wireless device is in communication with at least one of a mobile device, a network, and/or autonomous vehicles other than the wireless device.

6. A wireless device configured to operate in a wireless communication system, the wireless device comprising:
at least one transceiver;
at least one processor; and
at least one computer memory operably connectable to the at least one processor and storing instructions that, based on being executed by the at least one processor, perform operations comprising:
determining a frequency resource for transmission of MSG3 of a random access procedure within an active uplink (UL) bandwidth part (BWP) other than an initial UL BWP, wherein the frequency resource for transmission of the MSG3 within the active UL BWP starts from a lowest physical resource block (PRB) of the active UL BWP, and wherein a bandwidth of the frequency resource for transmission of the MSG3 within the active UL BWP is determined based on a bandwidth of the initial UL BWP; and transmitting, to a network via the at least one transceiver, the MSG3 through the frequency resource within the active UL BWP.

7. The wireless device of claim 6, wherein the active UL BWP does not comprise the initial UL BWP.

8. The wireless device of claim 6, wherein the MSG3 is transmitted to the network within the active UL BWP located either on a UL carrier or on a supplemental (SUL) carrier.

9. The wireless device of claim 8, wherein the UL carrier or the SUL carrier comprising the active UL BWP on which the MSG3 is transmitted is identical to a carrier on which a physical random access channel (PRACH) preamble is transmitted.

10. A method for receiving MSG3 of a random access procedure by a base station (BS) in a wireless communication system, the method comprising:
receiving, from a wireless device, the MSG3 through a frequency resource for reception of the MSG3 within an active uplink (UL) bandwidth part (BWP) other than an initial UL BWP,
wherein the frequency resource for reception of the MSG3 within the active UL BWP starts from a lowest physical resource block (PRB) of the active UL BWP, and
wherein a bandwidth of the frequency resource for reception of the MSG3 within the active UL BWP is determined based on a bandwidth of the initial UL BWP.

11. The of claim 10, wherein the active UL BWP does not comprise the initial UL BWP.

12. The of claim 10, wherein the MSG3 is received from the wireless device within the active UL BWP located either on a UL carrier or on a supplemental (SUL) carrier.

13. The of claim 12, wherein the UL carrier or the SUL carrier comprising the active UL BWP on which the MSG3 is received is identical to a carrier on which a random access preamble is received.

* * * * *